United States Patent Office 2,997,031
Patented Aug. 22, 1961

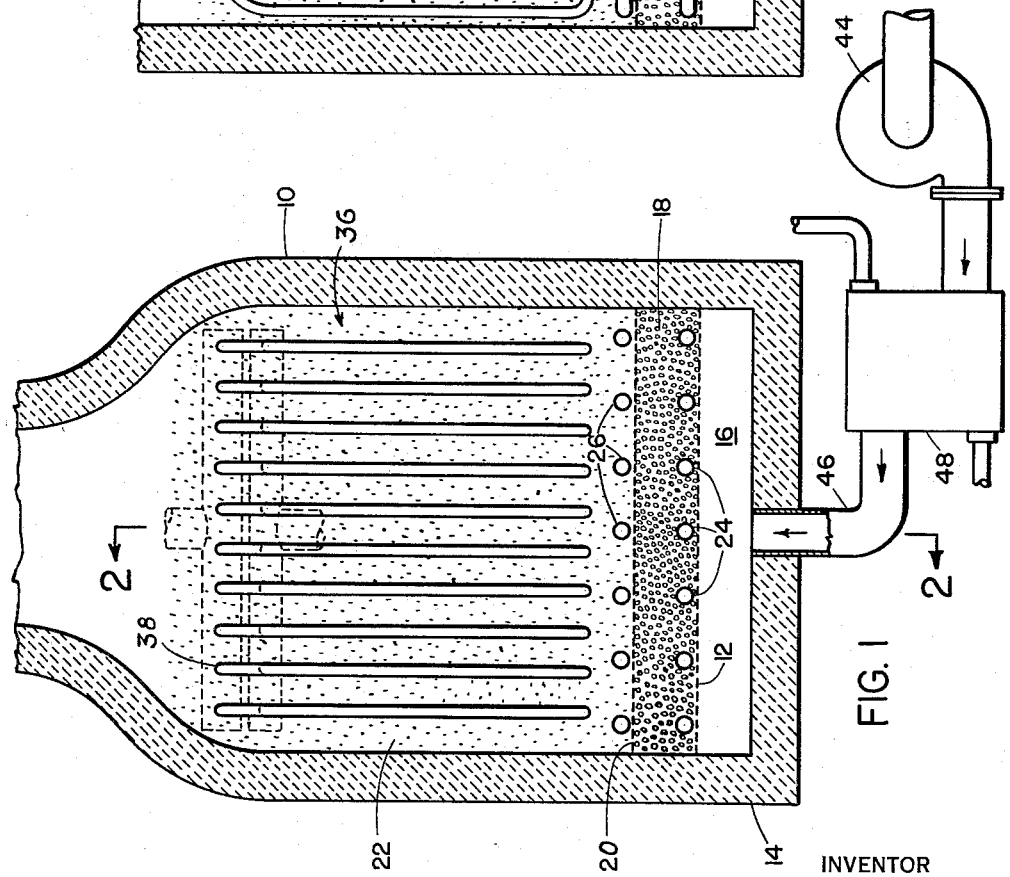

2,997,031
METHOD OF HEATING AND GENERATING STEAM
Richard C. Ulmer, Hastings on Hudson, N.Y., assignor to Combustion Engineering, Inc., New York, N.Y., a corporation of Delaware
Filed Dec. 12, 1955, Ser. No. 552,582
14 Claims. (Cl. 122—4)

This invention relates to an improved method for heating fluids involving the use of a fluidized discrete medium and has particular relation to such a method for generating and/or heating steam.

One of the recognized characteristics of a body or bed of particulate or discrete material which is in a fluidized condition through the action of the passage of a gas upwardly through the bed within a predetermined range of velocities is that a very high rate of heat transfer is had between this fluidizing gas and a fluid that is conveyed through a conduit or the like immersed within the fluidized bed. In order to take advantage of this high rate of heat transfer and utilize the same for the generation and/or heating of steam, as well as other fluids, in an efficient and expeditious manner the bed of material may be comprised in part or entirely of an oxidation catalyst with a fuel and air mixture being introduced into the lower portion of the bed and oxidized upon ascending through the bed thereby liberating heat with a portion of this heat being imparted to a fluid, which may be water, steam or other fluid, that is conveyed through a conduit immersed within the bed. In addition to the high heat transfer rate that prevails in such an instance, being many times that obtained with conventional systems, the heat release rate is likewise very high being many times that obtainable with conventional firing methods thus making the method extremely desirable because of the great reduction in size of equipment over that heretofore required for accomplishing the same result.

While various types and varieties of oxidation catalysts are known and available, all such catalysts that are commercially feasible, i.e., that are sufficiently economical to purchase and will withstand the rather high temperatures to which they are necessarily subjected and will have the necessary resistance to attrition, have a high activation temperature with this being the lowermost temperature at which the catalyst is operative to catalize the oxidation process of the fuel. Because of the high activation temperatures of these commercially feasible catalysts it has been necessary to devise a method of raising the temperature of the material of the bed to the activation temperature with this method being such that it is readily integrated into the entire system and does not destroy the economics of the system.

In accordance with the present invention this is achieved by passing a fuel-air mixture over a body of catalytic oxidizing material, which may take the form of a very thin layer of particles, with this relatively small quantity of material having a very high catalystic activity with a low activation temperature and accordingly being a relatively expensive catalyst. The fuel-air mixture passing over this material is catalytically oxidized and the hot combustion gases thus produced are passed through the bed of material within which the conduit is immersed thereby raising the temperature of this material. The fuel and air is regulated so as to raise the temperature of this bed of material to the point where a fuel and air mixture introduced into the bed will be completely oxidized. Thereafter fuel and air are supplied to this bed and oxidized therewithin with little or no fuel then being passed over and in contact with the high activity catalyst.

It is an object of this invention to provide an improved method for heating fluids employing the use of a fluidized discrete medium.

It is a further object of this invention to provide such an improved method which is economically feasible both in its starting up as well as in its continued and sustained operation.

Other and further objects of the invention will become apparent to those skilled in the art as the description proceeds.

For the purpose of illustration and to facilitate the explanation of the method of this invention reference is had to the accompanying drawings wherein:

FIG. 1 is a vertical section through one form of apparatus suitable for carrying out the invention; and FIG. 2 is a sectional view taken generally along line 2—2 of FIG. 1.

Referring to the illustrative organization depicted in the drawings, wherein like reference characters are used throughout to designate like elements, there is provided a housing 10 which may be of refractory material and which has a perforate plate 12 extending thereacross and spaced from the bottom or lower end 14 to provide a chamber 16. Resting upon plate 12 is a relatively thin layer of discrete material 18 which is an extremely highly active catalyst, such as platinum coated or impregnated activated alumina, and which has a relatively low activation temperature preferably in the neighborhood of 200 to 800° F. This material 18 is supported upon plate 12 with the openings in this plate being sufficiently small to prevent this material from passing therethrough. Immediately above the shallow layer of material 18 is perforate plate 20 which supports the relatively deep bed of discrete material 22 with the openings in plate 20 being effective to prevent the passage of either the discrete material 22 or 18 therethrough and thereby positively preventing intermixing of the same. The discrete material 22 is preferably comprised, in part or entirely, of an oxidation catalyst which is highly resistant to attrition, is capable of withstanding the necessarily high temperatures developed for the production of high temperature steam and is relatively cheap to purchase being much less than the expensive catalyst that is required to give the necessarily low activation temperature and high activity required of the shallow layer of catalyst 18. The activation temperature of material 22 is therefore relatively high and is much greater than that of material 18.

Fuel is introduced into the lower portion of the layer of material 18 and of bed 22 by distribution conduits 24 and 26, respectively, with these conduits extending across the full width of the bed and being spaced uniformly to provide an even distribution of fuel throughout the transverse section of the bed. One end of each of these conduits is connected to header 28 which receives a suitable fuel through supply conduit 30 with the conduits 24 and 26 being provided with valves 32 and 34, respectively, to control the flow of fuel to these conduits.

Immersed within the bed of material 22 is the heat exchange coil designated generally 36 and which includes a plurality of sinuously bent tubes 38 uniformly spaced across the width of housing 10 and interconnected at one end with inlet header 40 through which the tubes are supplied with water, with the other end of the tubes being connected with outlet header 42 which receives and collects the steam that passes from these tubes.

Air from blower or fan 44 is conveyed to chamber 16 through duct 46 with this air then forced upwardly through material 18 and 22. Associated with duct 46 is air heater 48 which may be of any desired type and which is effective to heat the air passing through this duct.

In initiating operation, fan 44 is activated to force air upwardly through the discrete material 18 and the material 22. This air is heated by heater 48 sufficiently so that the temperature of the catalytic material 18 in a short time, is raised to its relatively low activation temperature after which valves 32 are opened and fuel is admitted to this material through distribution conduits 24. This fuel, in the presence of the air passing upwardly through the material, is catalytically oxidized on the surface of this material with the hot gases thus produced passing upwardly through the material 22 located thereabove. Inasmuch as the oxidation catalyst here contemplated cannot withstand the high temperatures that are encountered with flame combustion without being destroyed or deactivated and since an oxidation catalyst can readily effect oxidation of a fuel-air mixture that is outside the range of imflammabilities, i.e., that is either too rich or too lean to burn with a flame, the fuel-air mixture that is introduced and passed through the catalytic material 18 is preferably maintained outside the range of imflammability so as to insure that flame combustion does not take place in this layer of catalytic material.

The supply of fuel and air to the material 18 in addition to being regulated so that this material remains below the maximum temperature which it can tolerate without being destroyed is regulated so that the combustion gases evolved will heat the bed of material 22 to a sufficiently high temperature that a fuel-air mixture may be introduced into the lower portion of the bed and oxidized therewithin with this temperature, of course, being much higher than the activation temperature of the catalytic material 18. After the material 22 has attained this temperature, valves 34 are opened and valves 32 are closed or substantially so with fuel then being introduced into the lower portion of the bed of material 22 through distribution conduits 26. Since the material 22 has been heated to the required temperature, this fuel, in the presence of the air passing upwardly through the material is completely oxidized within the height of this bed with the apparatus then being in condition for sustained operation and with a large portion of the heat liberated by this oxidation of the fuel being imparted to the water or other fluid passing through tubes 38 heating the fluid or if water is employed, converting this water to steam which is collected in header 42 from which it is conveyed to a suitable point of use.

Air heater 48 will generally be required only in initially heating the catalytic material 18 to its relatively low activation temperature and after this has been accomplished this heater, may, if desired, be deactivated although from the standpoint of efficiency and flexibility of operation it may be desirable to continue to preheat the incoming air somewhat even after the unit is started.

During the heating of the bed of material 22 it is preferable that the gas velocity flowing upwardly through this material be below that required for fluidization so that the material remains packed during this heating process thereby decreasing the rate of heat transfer to the tubes and accordingly decreasing the heat loss from the bed. After this material 22 has reached its desired temperature, however, so that complete oxidation of a fuel-air mixture that is introduced thereinto will be obtained and where at least a major portion of the fuel is introduced directly into the lower portion of this bed of material through distribution conduits 26 the gas flowing upwardly through this bed of material is regulated so that the material is fluidized with the very high rates of heat transfer that prevail with fluidization then being realized.

It may be desirable, after the bed of material 22 has been heated to its desired value and when the fuel is introduced into conduits 24, to admit sufficient fuel into the catalytic material 18 through distributing conduits 24 so as to maintain the temperature of this material slightly about its activation temperature thereby facilitating the reheating of the bed of material 22 should this for some reason be necessary.

In lieu of separating the material 18 from the material 22 by plate 20 the particles of the material 18 may be of sufficiently greater size or density than those of the material 22 so that they do not fluidize within the range of fluidization velocity of the material 22 whereby the material 18 will remain at the lower end of housing 10 for utilization in the starting operation. Alternatively the particles of the material 18 may be of substantially larger size than those of the material 22 but still fluidize within the range of fluidization velocity of the material 22 so that while plate 20 will be required, the openings in the plate need only be sufficiently small to prevent passage of the large particles of material 18 therethrough so that the pressure drop across the plate and accordingly the power loss occasioned thereby will be substantially less than that which would prevail if the openings were sufficiently small to completely separate the two materials.

With the method of this invention the bed of material within which the heat exchange coil is immersed and which is fluidized so that extremely high rates of heat transfer are obtained may be required to be heated to a relatively high temperature before a fuel-air mixture introduced therein will be completely oxidized and yet the method is both economical and feasible. Because only a small amount of the expensive catalytic material 18 is required and because this material has a low activation temperature the capital investment that is required to heat the bed of material 22 to its required temperature is relatively low with this method of initially heating this material readily lending itself to integration into the entire system.

While the material 22 has been referred to as catalytic the method comprehends the provision of this material being noncatalytic or inert. When this material is catalytic the temperature to which it must be heated before complete oxidation of a fuel-air mixture will take place therewithin will be lower than the corresponding required temperature for inert material. However, with a sufficiently high bed temperature complete oxidation of a fuel-air mixture will be had within a fluidized bed of inert material, as for example complete combustion of a natural gas and air mixture will be had in a bed of activated alumina heated to 1700° F. Although it will generally be preferable that the material 22 be a reasonably active oxidation catalyst, in certain instances it will be desirable that the material be inert as when the fuel employed will render a catalyst inactive because of poisoning.

In the illustrative organization all of the air is passed through the layer of material 18 even when little or no fuel is introduced into this material as when the unit is in its sustained operating condition. Since the passing of air through this material 18 is, of course, accompanied by a pressure drop and accordingly a power loss it may be advisable where the power loss due to pressure drop through the bed is excessive to separate the layer of material 18 from the lower end of the bed of particulate material 22 so that air may be introduced below this bed of material and above the material 18 and then provide a bypass arrangement for the air around the layer of material 18 which may be utilized after the organization is in condition for sustained operation, with all or a major portion of the air then bypassing this layer of material during sustained operation and accordingly decreasing the power loss.

The term "air" as used in the invention is intended to include all gases or gas mixtures capable of supporting combustion.

This description is intended for the purpose of explanation only and is not to limit the invention since many modifications which are within the scope and spirit of the invention will occur to those skilled in the art.

What I claim is:

1. The method of heating a fluid comprising providing a lower bed of particulate material that is at least in part an active oxidation catalyst having a limited range of operating temperatures below ordinary flame temperatures and an upper bed or particulate material whose ability to oxidize a fuel-air mixture is substantially less than that of said lower bed, passing a fuel-air mixture through said lower bed and effecting catalytic oxidation thereof within said bed, passing the hot gaseous effluent thus produced from said lower bed through said upper bed to thereby heat the same, supplying sufficient fuel and air supply so as to maintain the temperature of the catalyst, within its operating range and heat the upper bed to a sufficiently high temperature that oxidation of a fuel injected therein will be obtained, passing a fuel-air mixture through said upper bed and oxidizing the same therewithin, maintaining said upper bed fluidized during the oxidation of this fuel therewithin, and passing a fluid to be heated in indirect heat exchange relation with said upper bed.

2. The method of heating a fluid comprising passing a fuel-air mixture over a body of catalytic oxidizing material having a limited range of operating temperatures below ordinary flame temperatures and effecting catalytic oxidation thereof upon the surface of said material, passing hot gases evolved from this catalytic oxidation upwardly through a bed of particulate material within which a fuel-air mixture may be oxidized providing the temperature of the material is above a predetermined value which is well above the lower end of the operating range of the oxidation catalyst but below the upper range thereof, said gases thereby heating said material, supplying sufficient fuel and air so as to heat the bed of material above said predetermined value, introducing a fuel-air mixture into said bed of material, fluidizing said bed of material, oxidizing this fuel-air mixture within this bed, and imparting heat from said bed to a fluid by flowing said fluid through a conduit means immersed in said bed.

3. The method of claim 2 wherein the fuel and air mixture passed over the body of catalytic oxidizing material is regulated so that the bed of particulate material is maintained in a packed condition while it is being heated by the passage therethrough of the hot gases developed by the catalytic oxidation of said fuel-air mixture.

4. The method of heating a fluid comprising flowing a fuel-air mixture which is outside the range of imflammability over a body of material that is at least in part an active oxidation catalyst, effecting catalytic oxidation of said mixture upon the surface of said catalyst and at a temperature well below ordinary flame temperature, passing the hot gases evolved from this catalytic oxidation upwardly through a bed of particulate material within which a fuel-air mixture may be oxidized provided the temperature of the material is above a predetermined value which is well above the lower end of the operating range of the oxidation catalyst but below the upper range thereof, said gases thereby heating said material, supplying sufficient fuel and air so as to heat the bed of material above said predetermined value, introducing a fuel-air mixture into said bed of material, fluidizing said bed of material, oxidizing this fuel-air mixture within this bed, and imparting heat from said bed to a fluid by flowing said fluid through a conduit means immersed in said bed.

5. The method of generating steam comprising passing a fuel-air mixture over a body of catalytic oxidizing material having a limited range of operating temperatures below ordinary flame temperatures and effecting catalytic oxidation thereof upon the surface of said material, passing the hot gases evolved from this catalytic oxidation upwardly through a bed of particulate material which is comprised at least in part of an oxidation catalyst having substantially less activity and higher activation temperature than the first mentioned catalyst with said activation temperature lying within the operating range of said first mentioned catalyst, supplying sufficient fuel and air so as to heat the bed of material to the activation temperature of the second mentioned catalyst, introducing a fuel-air mixture into said bed, catalytically oxidizing this fuel-air mixture within this bed, maintaining said bed fluidized during the oxidation of fuel therewithin, and converting water to steam by flowing the water through a conduit means immersed in said bed.

6. The method of generating steam comprising flowing a fuel-air mixture over a body of material that is an active oxidation catalyst having an activation temperature of not more than 800° F., heating said catalyst to said activation temperature and effecting catalytic oxidation of said fuel-air mixture upon the surface of said catalyst, passing the hot gases evolved from this catalytic oxidation upwardly through a bed of particulate material within which a fuel-air mixture may be oxidized provided the temperature of the material is above a predetermined value which is well above the lower end of the operating range of the oxidation catalyst but below the upper range thereof, said gases thereby heating said material, regulating the supply of fuel and air so as to heat the bed of material above said predetermined value, thereafter supplying a fuel-air mixture to said bed of material at a rate sufficient to fluidize the same, oxidizing this fuel-air mixture within this bed and, evaporating water to steam by passing the same through a heat exchange means immersed in said bed.

7. A method for indirectly heating fluids comprising the steps of passing an air-fuel mixture containing a large excess of air over that required to oxidize the fuel through a first bed of oxidation catalyst of relatively high activity, effecting oxidation of said dilute air-fuel mixture in said first bed of catalyst to produce an effluent oxygen-containing gas at an elevated temperature, adding additional fuel to said hot effluent gas and passing the resultant mixture upwardly through a second bed of oxidation catalyst containing catalyst particles of relatively lower activity which are maintained in a fluidized condition by the upwardly flowing gas stream, catalytically oxidizing the additional fuel in said second bed thereby releasing heat in said bed, flowing a fluid in indirect heat exchange with said fluidized bed to absorb heat therefrom and thereby heat said fluid.

8. A method for indirectly heating fluids comprising steps of passing an air-fuel mixture containing a large excess of air over that required to oxidize the fuel through a first bed of oxidation catalyst of relatively small volume and of relatively high activity, the elements making up said first bed being so disposed as to remain substantially stationary under operating conditions, effecting oxidation of said dilute air-fuel mixture in said first bed of catalyst to produce an effluent oxygen-containing gas at an elevated temperature, adding additional fuel to said hot effluent gas and passing the resultant mixture upwardly through a second bed of oxidation catalyst of relatively larger volume and of lower activity and consisting of particles maintained in a fluidized condition by the upwardly flowing gas stream, catalytically oxidizing said additional fuel in said second bed thereby releasing heat in said bed, flowing a fluid in indirect heat exchange with said fluidized bed to absorb heat therefrom and thereby heat said fluid.

9. A method for indirectly heating fluids comprising the steps of passing an air-fuel mixture containing a large excess of air over that required to oxidize the fuel through a first bed of oxidation catalyst of relatively high activity, the component elements of said first bed being so disposed that they undergo substantially no movement under operating conditions, effecting oxidation of said dilute air-fuel mixture in said first bed of catalyst to produce an effluent oxygen-containing gas at an elevated temperature, adding additional fuel to said hot effluent gas and passing the resultant mixture upwardly through a second bed containing particles of oxidation catalyst of relatively lower activity, said second bed being directly super-imposed over said first bed and having substantially the same horizontal cross-sectional area, maintaining the said second bed in a fluidized condition by the upwardly flowing gas stream, catalytically oxidizing the additional fuel in said second bed thereby releasing heat in said bed, flowing a fluid in indirect heat exchange with said fluidized bed to absorb heat therefrom and thereby heat said fluid.

10. The method of heating a fluid comprising providing a first bed of particulate material that is at least in part an active oxidation catalyst, providing a second bed of discrete material that is comprised at least in part of an oxidation catalyst of substantially less activity than said active catalyst, passing a fuel air mixture through one of these beds and oxidizing fuel therein to produce an effluent of an elevated temperature, passing a gas stream that contains a fuel air mixture and that includes said hot effluent up through the other of said beds which is maintained in a fluidized condition by said gas stream, oxidizing fuel in said second bed thereby releasing heat in said bed and flowing a fluid in indirect heat exchange with said fluidized bed to absorb heat therefrom and thereby heat said fluid.

11. A method for indirectly heating fluids comprising the steps of passing a fuel-air mixture through a first bed of oxidation catalyst of relatively high activity, effecting oxidation of fuel in said first bed of catalyst to produce an effluent of an elevated temperature, passing a gas stream that contains a fuel-air mixture and that includes said hot effluent upwardly through a second bed of oxidation catalyst containing catalyst particles of relatively lower activity which are maintained in a fluidized condition by said gas stream, oxidizing fuel in said second bed thereby releasing heat in said bed, and flowing a fluid in indirect heat exchange with said fluidized bed to absorb heat therefrom and thereby heat said fluid.

12. An apparatus for indirectly heating fluids comprising a chamber, a first bed of oxidation catalyst of relatively high activity and of such weight that the component elements of said bed remain substantially stationary under operating conditions, a second bed of oxidation catalyst in the upper portion of said chamber directly superimposed over said first bed and made up of particles of an oxidation catalyst of relatively lower activity of such size as to undergo fluidization under conditions of operation, heat exchange means immersed within said second bed to accommodate the circulation of a fluid to be heated, means for introducing combustion air into the bottom of said first bed, and means for introducing fuel into said combustion air such that the fuel-air mixture flows upwardly through said first bed in contact with the catalyst therein.

13. An apparatus for indirectly heating fluids comprising a chamber, a first bed of oxidation catalyst of relatively high activity in the lower portion of said chamber, a second bed of oxidation catalyst in the upper portion of said chamber directly superimposed over said first bed and made up of particles of an oxidation catalyst of relatively lower activity of such size as to undergo fluidization under conditions of operation, heat exchange means immersed within said second bed to accommodate the circulation of a fluid to be heated, means for introducing combustion air into the bottom of said first bed, fuel distributing means arranged in the lower portion of said first bed, and additional fuel distributing means being arranged in the lower portion of said second bed.

14. Apparatus for indirectly heating fluids comprising a chamber, a first bed of oxidation catalyst of relatively high activity arranged in the lower portion of said chamber, a second bed of oxidation catalyst directly superimposed over said first bed and comprised of particles of oxidation catalyst of relatively lower activity and of such size as to undergo fluidization under operating conditions, heat exchange means arranged in said second bed and adapted to accommodate the circulation of a fluid to be heated, and distributing means arranged beneath said lower bed for uniformly distributing combustion air over the area of said lower bed, said first and second beds having substantially the same cross-sectional area in the direction of gas flow and communicating with one another at a multiplicity of points at their interface such that the effluent gases from said first bed are distributed uniformly throughout the area of the second bed thus promoting uniform fluidization thereof, and means for introducing fuel into said combustion air such that the fuel-air mixture flows upwardly through said first bed in contact with the oxidation catalyst therein.

References Cited in the file of this patent

UNITED STATES PATENTS

| | | |
|---|---|---|
| 2,729,428 | Milmore | Jan. 3, 1956 |
| 2,750,258 | Jukkola et al. | June 12, 1956 |